(12) United States Patent
Jung et al.

(10) Patent No.: US 7,624,128 B2
(45) Date of Patent: Nov. 24, 2009

(54) METHOD AND APPARATUS FOR SYNCHRONIZING EPG INFORMATION BETWEEN SERVER AND CLIENT

(75) Inventors: Tae-ung Jung, Suwon-si (KR); Yong-sung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 282 days.

(21) Appl. No.: 11/515,015

(22) Filed: Sep. 5, 2006

(65) Prior Publication Data

US 2007/0055709 A1 Mar. 8, 2007

(30) Foreign Application Priority Data

Sep. 3, 2005 (KR) ............. 10-2005-0081999

(51) Int. Cl.
 *G06F 17/00* (2006.01)
 *G06F 17/30* (2006.01)
(52) U.S. Cl. .......................... 707/201; 707/8; 707/200; 707/100; 707/203; 709/205; 709/248; 711/173; 714/4; 714/47; 725/39
(58) Field of Classification Search .............. 714/47, 714/4; 711/173; 709/205, 248; 707/201, 707/8, 203, 100, 200; 725/39; 719/313
 See application file for complete search history.

(56) References Cited

U.S. PATENT DOCUMENTS

| | | | | |
|---|---|---|---|---|
| 5,475,834 A * | 12/1995 | Anglin et al. | ............... | 707/203 |
| 5,917,481 A | 6/1999 | Rzeszewski et al. | | |
| 6,763,522 B1 * | 7/2004 | Kondo et al. | ................... | 725/39 |
| 6,895,586 B1 * | 5/2005 | Brasher et al. | ............... | 719/313 |
| 7,383,463 B2 * | 6/2008 | Hayden et al. | .................. | 714/4 |
| 2004/0078370 A1 * | 4/2004 | Acree et al. | ..................... | 707/8 |
| 2004/0103141 A1 * | 5/2004 | Miller et al. | ................. | 709/203 |
| 2004/0107199 A1 * | 6/2004 | Dalrymple et al. | .......... | 707/100 |
| 2004/0117507 A1 * | 6/2004 | Torma | ......................... | 709/248 |
| 2004/0172423 A1 * | 9/2004 | Kaasten et al. | ............. | 707/201 |
| 2005/0091316 A1 * | 4/2005 | Ponce et al. | ................ | 709/205 |
| 2005/0125621 A1 * | 6/2005 | Shah | .......................... | 711/173 |
| 2005/0144538 A1 * | 6/2005 | Lawrence et al. | ............. | 714/47 |

FOREIGN PATENT DOCUMENTS

| | | |
|---|---|---|
| JP | 2000-307968 A | 11/2000 |
| JP | 2003-046979 A | 2/2003 |
| KR | 10-2001-0058364 A | 7/2001 |
| KR | 10-0385328 B1 | 5/2003 |

* cited by examiner

*Primary Examiner*—James Trujillo
*Assistant Examiner*—William Spieler
(74) *Attorney, Agent, or Firm*—Sughrue Mion, PLLC

(57) ABSTRACT

A method and apparatus for synchronizing EPG information between a server and a client in a digital broadcasting network are provided. The server updates synchronization files according to information which is modified after a last synchronization file is created according to the update of the server-side EPG information, creates a synchronization file according to information which is modified after the last synchronization file is created, and transfers a synchronization file to one of the clients, where the synchronization file is created first after the EPG information pieces of the clients are updated among from the synchronization files stored in the clients. Accordingly, the server and the client can be easily synchronized with each other by transferring or receiving only one file, since all synchronization files can include the latest update history by transferring only one synchronization file.

21 Claims, 15 Drawing Sheets

FIG. 2

SERVER DB

| INSERT | DELETE | UPDATE | ID | ChNum | S TIME | E TIME | TITLE |
|---|---|---|---|---|---|---|---|
| 06:00 | | | 1 | 11 | 09:00 | 10:00 | A |
| 06:00 | | | 2 | 11 | 10:10 | 11:00 | B |
| 06:00 | | | 3 | 11 | 11:00 | 12:00 | C |
| 06:00 | | | 4 | 11 | 12:00 | 13:00 | D |
| 06:00 | | | 5 | 11 | 13:00 | 14:00 | E |
| | | 06:30 | 6 | 11 | 11:00 | 12:30 | C |
| | | 06:30 | 7 | 11 | 12:30 | 13:00 | D |
| | | 07:00 | 8 | 11 | 11:00 | 12:00 | C |
| | | 07:00 | 9 | 11 | 12:00 | 13:00 | D |
| 07:10 | | | 10 | 11 | 14:00 | 15:00 | F |
| | 07:10 | | 11 | 11 | 14:00 | 15:00 | F |
| 07:11 | | | 12 | 11 | 14:00 | 15:00 | F |
| | 07:11 | | 13 | 11 | 14:00 | 15:00 | F |
| 07:12 | | | 14 | 11 | 14:00 | 15:00 | F |
| | 07:12 | | 15 | 11 | 14:00 | 15:00 | F |
| 07:13 | | | 16 | 11 | 14:00 | 15:00 | F |

FILE TO BE TRANSFERRED

| STATUS | ID | ChNum | S TIME | E TIME | TITLE |
|---|---|---|---|---|---|
| INSERT | 1 | 11 | 09:00 | 10:00 | A |
| INSERT | 2 | 11 | 10:00 | 11:00 | B |
| INSERT | 3 | 11 | 11:00 | 12:00 | C |
| INSERT | 4 | 11 | 12:00 | 13:00 | D |
| INSERT | 5 | 11 | 13:00 | 14:00 | E |
| UPDATE | 6 | 11 | 11:00 | 12:30 | C |
| UPDATE | 7 | 11 | 12:30 | 13:00 | D |

| STATUS | ID | ChNum | S TIME | E TIME | TITLE |
|---|---|---|---|---|---|
| UPDATE | 8 | 11 | 11:00 | 12:00 | C |
| UPDATE | 9 | 11 | 12:00 | 13:00 | D |
| INSERT | 10 | 11 | 14:00 | 15:00 | F |
| DELETE | 11 | 11 | 14:00 | 15:00 | F |
| INSERT | 12 | 11 | 14:00 | 15:00 | F |
| DELETE | 13 | 11 | 14:00 | 15:00 | F |
| INSERT | 14 | 11 | 14:00 | 15:00 | F |
| DELETE | 15 | 11 | 14:00 | 15:00 | F |
| INSERT | 16 | 11 | 14:00 | 15:00 | F |

| ID | ACTION | ChNum | S TIME | E TIME | TITLE |
|----|--------|-------|--------|--------|-------|
| 1  | NULL   | 11    | 09:00  | 10:00  | A     |
| 2  | NULL   | 11    | 10:00  | 11:00  | B     |
| 3  | NULL   | 11    | 11:00  | 12:00  | C     |
| 4  | NULL   | 11    | 12:00  | 13:00  | D     |
| 5  | INS    | 11    | 13:00  | 14:00  | E     |

FIG. 4B

| ID | ACTION | ChNum | S TIME | E TIME | TITLE |
|----|--------|-------|--------|--------|-------|
| 1  | NULL   | 11    | 09:00  | 10:00  | A     |
| 2  | NULL   | 11    | 10:00  | 11:00  | B     |
| 3  | NULL   | 11    | 11:00  | 12:00  | C     |
| 4  | NULL   | 11    | 12:00  | 13:00  | D     |
| 5  | NULL   | 11    | 13:00  | 14:00  | E     |

FIG. 5A

Update.20050501.00.R.epg

```
<chNum>11</chNum>
<Ins>
<i>1</i><i>4</i><i>6</i><i>9</i>
<i>10</i>
</Ins>
```

FIG. 5B

Update.20050501.01.epg

```
<chNum>11</chNum>
<Ins>
<i>6</i><i>9</i><i>10</i>
</Ins>
<Upd>
<i>1</i>
</Upd>
<Del>
<i>2</i><i>3</i>
</Del>
```

METHOD AND APPARATUS FOR SYNCHRONIZING EPG INFORMATION BETWEEN SERVER AND CLIENT

CROSS-REFERENCE TO RELATED PATENT APPLICATION

This application claims the benefit of Korean Patent Application No. 10-2005-0081999, filed on Sep. 3, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to data synchronization between a server and a client, and more particularly, to synchronizing EPG information between a server and a client in a digital broadcasting network.

2. Description of the Related Art

With the development of multimedia, the number of broadcasting service providers is increasing. Ever since cable broadcasting service providers have started broadcasting for niche markets where over-the-air broadcasting is not readily received, not only cable television (TV) service providers providing specialized channels of specific genres with better quality, but also satellite cable TV service providers have entered into the market. The service providers use tens to hundreds of channels. Information on the channels has to be provided to create a TV time table and to notify that the channels exist. A service provider allocates a specific channel as an electronic program guide (EPG) channel to provide the channel information. In this case, TV viewers passively observe the channel information scrolling on a TV screen. To avoid this, a method has been needed in which information on TV program is transferred through a network, and the information is stored in a client system so that the information can be immediately obtained at the request of a user.

In the case of digital broadcasting, the information is provided along with program and system information protocol (PSIP) data to be analyzed in the client system. However, the amount of information obtained in this way is small. For this reason, the information has to be provided through a network to provide larger and better information.

However, the cost to use the network and the amount of data to be transferred become excessive when the EPG information relating to many channels is processed. Therefore, an effective method of synchronizing EPG information is required.

To provide an effective personal video recorder (PVR) by using the EPG information, one to two weeks' amount of EPG information is required. Since programs scheduled to be broadcasted are frequently deleted, and new programs are frequently added, relevant information has to be updated in the client system. According to how the information is configured, communication between a server and a client is significantly affected.

FIG. 1 illustrates a structure of a related art digital broadcasting system for synchronizing EPG information.

The system of FIG. 1 is disclosed in the Korean Patent No. 10-0385328. When a server administrator adds, deletes, or updates the EPG information, the server cyclically creates a synchronization file whenever the EPG information is modified. In addition, clients, each of which has different synchronization times with each other, separately receive relevant synchronization files to synchronize the EPG information. This will be now described in detail with reference to FIG. 1.

When the server administrator modifies data, an update date tracing unit 101 writes a modification time into a server database 107 along with information on which actions (insert/delete/update) have been carried out.

FIG. 2 illustrates a modification history table stored in the server database 107 and a file to be transferred. When a server scheduler 103 generates an event to create a synchronization file, an update data creating unit 105 extracts records corresponding to a predetermined time period from the server database 107 to be stored in a file storing unit 109. For example, if an update file is created twice a day at 10:00 and 22:00, each synchronization file is configured according to the EPG information modified between 22:01 to 09:59 and 10:01 to 21:59.

At the client-side, when it is time to update the EPG information, a PVR scheduler 115 generates an event therefore and requests data from the server via a downloader unit 113. At the server-side, the synchronization file is transmitted through a data providing unit 111, and a client system requests a retransmission of required synchronization files included in a synchronization file list. After all required synchronization files are received at the client-side, the synchronization files are stored in the file storing unit 109. Then, a data update unit 119 reads the synchronization files and updates a PVR database 121 according to the content of the synchronization files.

However, in this case, the synchronization files created at the server-side include all content modified during the time period. As a result, unnecessary content is also included in the synchronization files. This causes file size to increase, thereby deteriorating file transfer efficiency.

Whenever the EPG information is modified, its modification history relating to the actions (insert/delete/update) is stored in the server database 107. As a result, when data is updated or deleted, the modification history of previous data still remains. This causes a waste of resources of the server database 107. Further, data may not be efficiently extracted.

For example, referring to FIG. 2, from 07:10 to 07:13, the server administrator deletes an item three times and inserts the item four times. This is the same as in the case when no modification occurs ever since the item is inserted at 07:10. Every modification history is stored in the server database in the order of a time sequence. Also, a synchronization file to be transmitted to the client system includes all the modification history.

At the client-side, when the client system has not been used for long, or the user just has purchased the client system, every synchronization file created before current data is configured is received and its database is updated according to the modified history recorded in the synchronization file. Consequently, the same process performed at the server-side has to be repeated at the client-side, thereby performing unnecessary operations.

SUMMARY OF THE INVENTION

The present invention provides a method and apparatus for effectively synchronizing EPG information between a server and a client, in which a new modification history is applied to all existing synchronization files whenever the EPG information is updated, and data relating to unnecessary EPG information is deleted from a server database after a synchronization file is created.

According to an aspect of the present invention, there is provided a method of providing synchronization files to clients so as to synchronize server-side EPG information with EPG information pieces of the clients, the method comprising: (a) updating synchronization files, that are created respectively according to the updates of the server-side EPG information, according to information which is modified after a last synchronization file is created; (b) creating a synchronization file according to information which is modified after the last synchronization file is created; and (c) transferring a synchronization file to one of the clients, where the synchronization file is created first after the EPG information of the client is updated among from the synchronization files updated in the operation (a) and the synchronization file created in the operation (b).

In addition, the method may further comprise: writing action type information into an action type field of an item modified in an EPG table whenever EPG information is updated; and initializing the action type field after the synchronization file is created in the operation (b), wherein, in the operation (a), the modified information is recognized with reference to the action type field.

The present invention also provides a computer-readable medium having embodied thereon a computer program for executing any one of the method of providing synchronizing files to clients, where the synchronization files are provided by a server to synchronize server-side EPG information with each of client-side EPG information pieces.

According to another aspect of the present invention, there is provided a server apparatus for providing synchronization files to clients so as to synchronize server-side EPG information with EPG information pieces of the clients, the apparatus comprising: a file storing unit which stores synchronization files created respectively according to the updates of the server-side EPG information; a scheduler which generates an event to create a synchronization file according to items that are modified in an EPG table after the last synchronization file among the previous synchronization files are created; an update information synchronizer which updates all previous synchronization files stored in the file storing unit according to the modified items when the event is generated, creates a synchronization file based on the modified items, and stores the synchronization file to the file storing unit; and a file transfer unit which transfers a synchronization file to one of the clients, where the synchronization file is created first after the EPG information of the client is updated among from the synchronization file stored in the file storing unit.

According to another aspect of the present invention, there is provided a method of synchronizing client-side EPG information with server-side EPG information in a digital broadcasting network, the method comprising: receiving a list of synchronization files created according to the update of the server-side EPG information; selecting a synchronization file in the list of the synchronization files, which is created first after a latest update time of the client-side EPG information, and receiving the synchronization file; and updating the EPG information by using the received synchronization file.

In addition, all of the synchronization files in the list may include a modification history of the server-side EPG information from the time of file creation up to the present.

The present invention also provides a computer-readable medium having embodied thereon a computer program for executing any one of the method of synchronizing client-side EPG information with server-side EPG information in a digital broadcasting network.

According to an aspect of the present invention, there is provided a client apparatus for synchronizing client-side EPG information with server-side EPG information in a digital broadcasting network, the apparatus comprising: a file determining unit which determines a file to be received which is included in a synchronization file list, where the file is a synchronization file created first after client-side EPG information is updated to the latest version; a file requesting unit which requests a synchronization file selected in the file determining unit to a sever; and an update unit which updates the client-side EPG information by using a synchronization file received in response to the file request.

In addition, the synchronization files in the list may reflect the recent EPG information of the server-side.

In addition, the synchronization files in the list may be created such that each file name thereof includes information on a file creation date and time.

BRIEF DESCRIPTION OF THE DRAWINGS

The above and other features and advantages of the present invention will become more apparent by describing in detail exemplary embodiments thereof with reference to the attached drawings in which:

FIG. 2 illustrates the content of a synchronization file for synchronizing EPG information according to the prior art;

FIGS. 4A to 4B illustrate EPG tables according to an exemplary embodiment of the present invention;

FIGS. 5A and 5B illustrate source codes of synchronization files written in the xml format according to an exemplary embodiment of the present invention;

DETAILED DESCRIPTION OF THE INVENTION

Hereinafter, the present invention will be described in detail by explaining exemplary embodiments of the invention with reference to the attached drawings.

Figure 1:
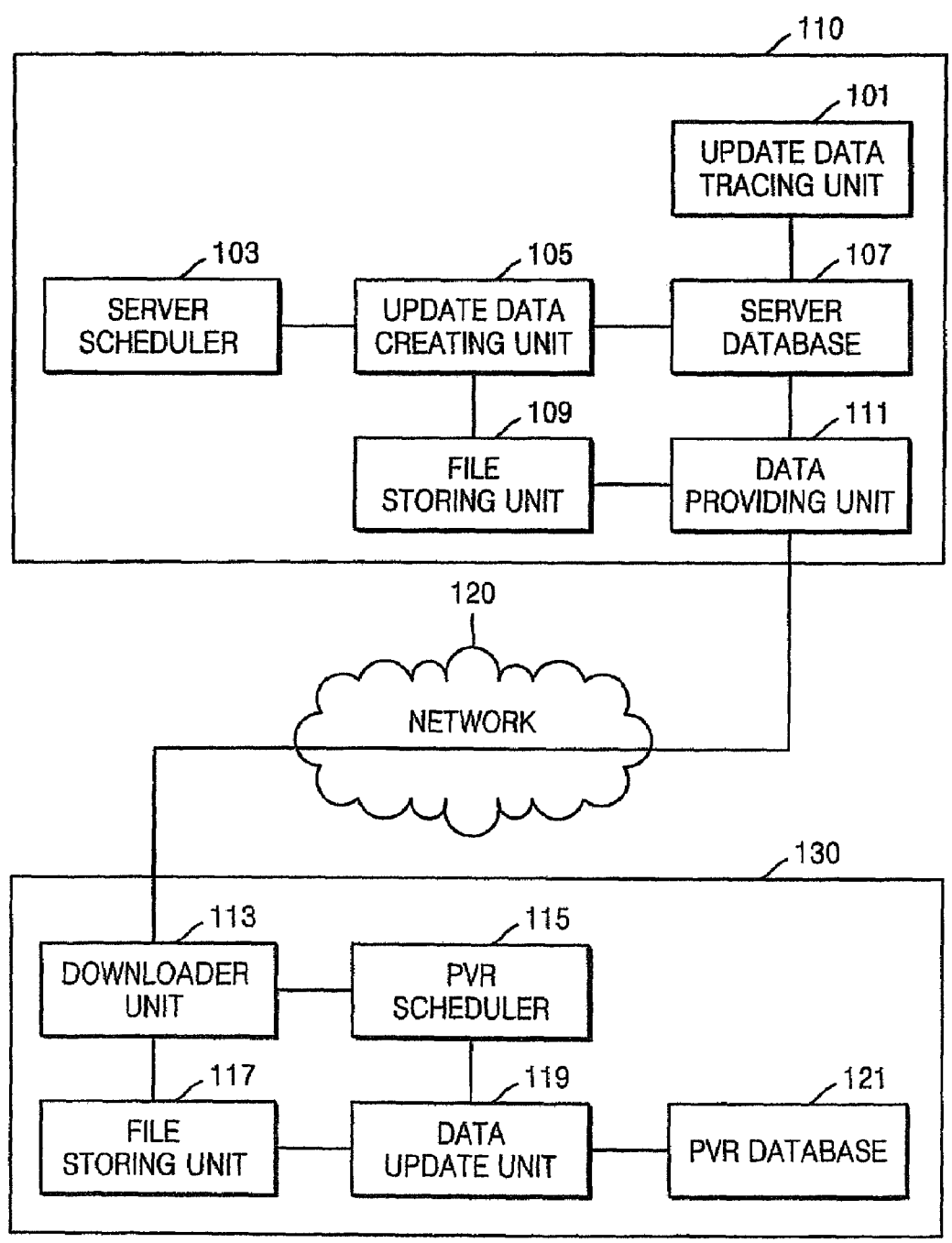
FIG. 1 illustrates a structure of a conventional digital broadcasting system for synchronizing EPG information.
Figure 3:
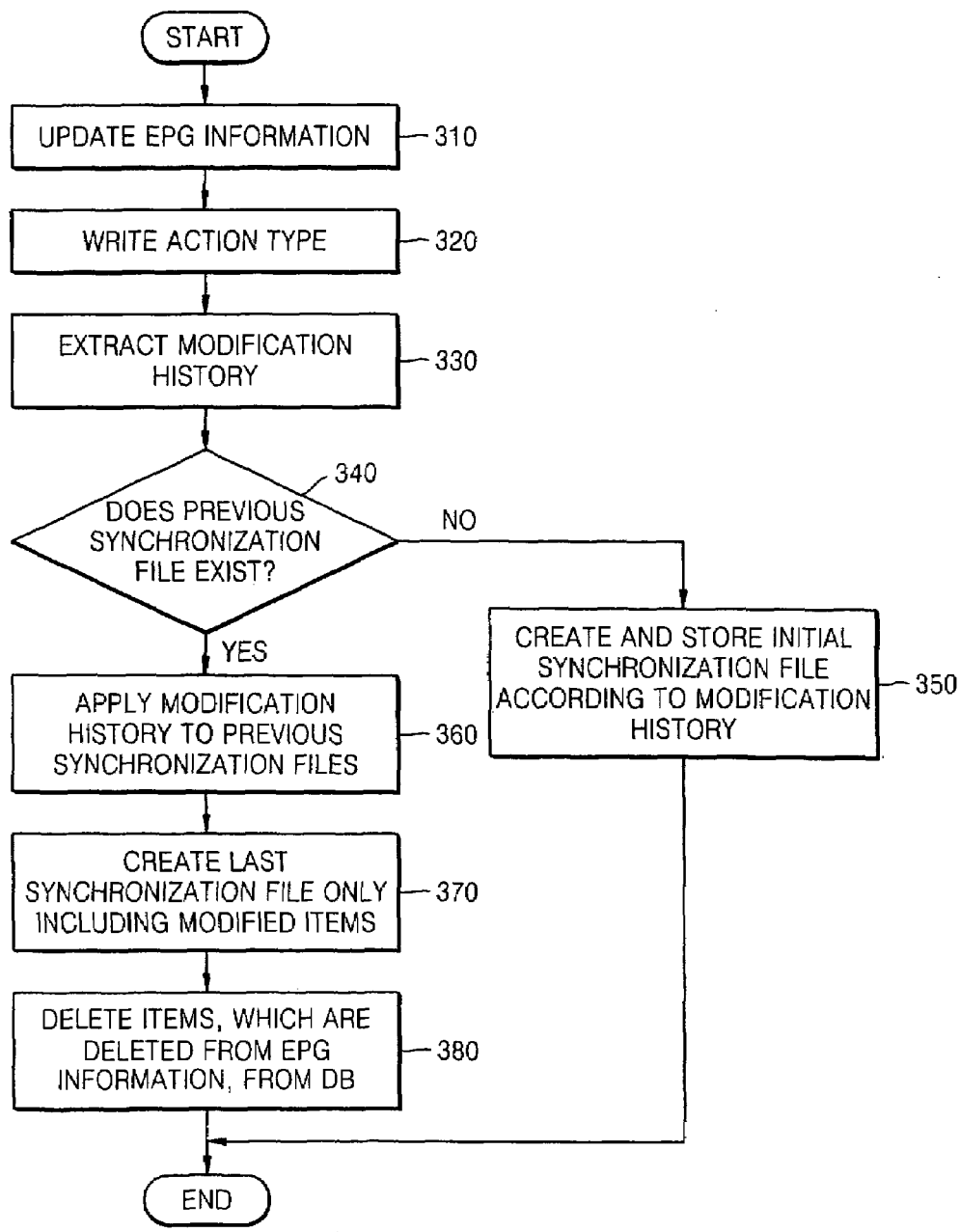
FIG. 3 is a flowchart illustrating a process of creating a server-side synchronization file according to an exemplary embodiment of the present invention.

FIG. 3 is a flowchart illustrating a process of creating a server-side synchronization file according to an exemplary embodiment of the present invention.

The synchronization file stores modification history of server-side EPG in order to update client-side EPG information. The synchronization file is cyclically created and includes the latest update history. The content of the synchronization file may be written in extensible markup language (XML) format as shown in FIG. 5. According to an update history, programs may be written using <Ins>, <Upd>, and <Del> tags. FIGS. 5A and 5B will be described in detail later.

When a server administrator updates EPG information (operation 310), a server writes action type information (i.e., insert, delete, update, etc.) to an EPG table (operation 320). When a sever scheduler generates an event to generate a synchronization file, information is extracted on items which have been actually modified thereafter.

Next, it is determined whether a previously created synchronization file exists in a file storing unit for storing the synchronization file. If it does not exist, an initial synchronization file is created so that it includes all items contained in a current EPG table, and the initial synchronization file is then stored in the file storing unit (operation 350). If it exists, previous synchronization files are updated according to the modified items (operation 360). Thereafter, a last synchronization file is created so that it includes only the modified items (operation 370). Thereafter, items deleted by the server administrator, that is, items of which action type is DEL, are deleted from a database.

Accordingly, all clients can obtain the latest EPG information by downloading only the next subsequent version of a current synchronization file regardless of the latest EPG update time of the clients, and the server no longer has to store data relating to deleted items.

FIGS. 4A to 4B illustrate EPG tables according to an exemplary embodiment of the present invention.

In the EPG table of FIG. 4A, item 5 is inserted in the case when programs corresponding to items 1 to 4 already exist. When a user inserts, deletes, or updates data, it is written in the action type field. In the action field, unmodified items stay in an initial state of NULL. After the synchronization file is created, the action file is reinitialized to NULL. Thus, if the action type field is not NULL, it shows that modification has occurred at least once. In the EPG table of FIG. 4B, the synchronization file is created according to a modification history, and then all of the action type fields are initialized to NULL.

Since the action type field is initialized after the synchronization file is created according to the modification history, when items are updated at a later time, it is possible to determine which items have been updated.

FIGS. 5A and B illustrate source codes of synchronization files written in the xml format according to an exemplary embodiment of the present invention. In FIG. 5A, items 1, 4, 6, 9, and 10 are inserted. In FIG. 5B, items 6, 9, and 10 are inserted, item 1 is updated, and items 2 and 4 are deleted. For convenience, the synchronization files include only an ID of an item in this exemplary embodiment, but all information on the item may be included in the synchronization file in practice.

The synchronization file of FIG. 5A is the initial synchronization file which is the oldest synchronization file. The oldest synchronization file is transferred to a client along with other synchronization files. Further, the oldest synchronization file may be used to create reference information which is needed to apply the modification history to other synchronization files.

Later version synchronization files are created according to only the items which have been updated with respect to the initial synchronization file. Thus, when the EPG table is modified and synchronization files are then updated, the initial synchronization file is first updated according to the current EPG information. Then, the later version synchronization files are updated according to only the modification history applied to the initial synchronization file, so that all synchronization files can include the current EPG information. In the case of a newly purchased client system, or in the case when no synchronization files are stored in a client database, the latest EPG information can be obtained by just downloading the initial synchronization file. Referring to FIG. 5A, the initial synchronization file has only <Ins> tags.

Figure 6:
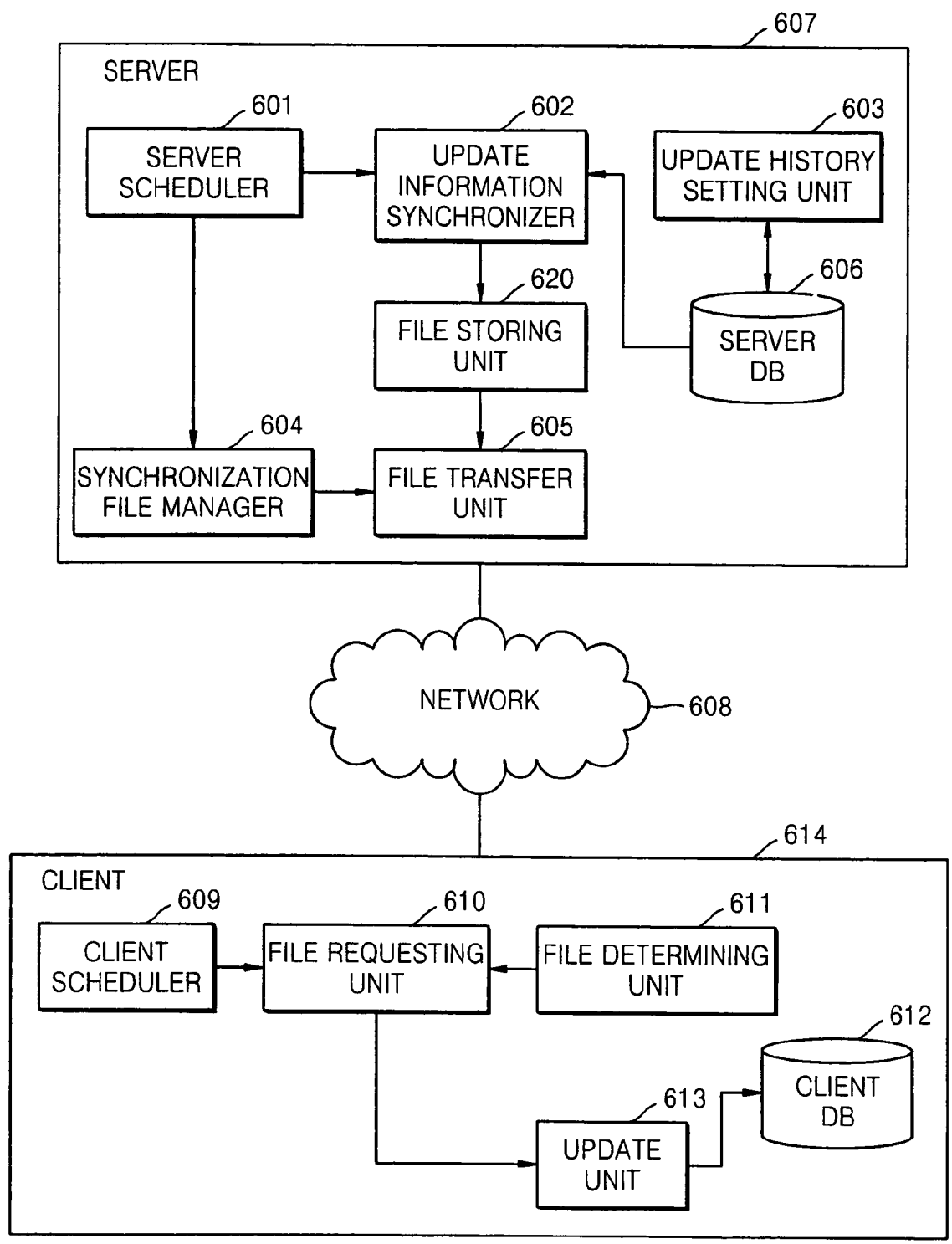
FIG. 6 illustrates a structure of a digital broadcasting system according to an exemplary embodiment of the present invention.

FIG. 6 illustrates a structure of a digital broadcasting system according to an exemplary embodiment of the present invention.

Referring to FIG. 6, a server 607 includes a server scheduler 601, an update information synchronizer 602, an update history setting unit 603, a server database 606, a file transfer unit 605, a synchronization file manager 604 and a file storing unit 620. A client 614 includes a client scheduler 609, a file requesting unit 610, a file determining unit 611, an update unit 613, and a client database 612.

The server scheduler 601 generates an event to notify the need to create a synchronization file for items in the EPG table, the items which have been modified since the latest synchronization file was created.

In response to the event, the update information synchronizer 602 extracts items which have been modified during a predetermined time period from the EPG table, updates all previous synchronization files stored in a file storing unit 620, creates the latest synchronization file updated according to only the modified items, and stores the latest synchronization file into the file storing unit 620.

When the server administrator updates server-side EPG information, the update history setting unit 603 writes action type information of each item into the EPG table to be stored in the server database 606. Further, the update history setting unit 603 initializes action type fields of the EPG table to NULL when the update information synchronizer 602 creates the latest synchronization file. Action type fields show which items have been updated after a new time period starts, and the update information synchronizer 602 recognizes modified items according to the action type field values.

In response to the request of the client 614, the file transfer unit 605 transfers a synchronization file list or a synchronization file, and the server database 606 stores the EPG information.

The synchronization file manager 604 deletes old synchronization files from the server database 606. However, since the initial synchronization file has to exist all the time, the content of the initial synchronization file has to be copied to a second oldest file stored in the file storing unit 620 prior to the deletion the initial synchronization file. This will be described in detail later.

When it is time for the client 614 to update the EPG information, the client scheduler 609 generates an event. Then, the file requesting unit 610 requests the synchronization file list from the server 607 by sending a request to the server 607. The file determining unit 611 determines the synchronization file to be received which is included in the synchronization file list, where the synchronization file is a synchronization file created first after the client-side EPG information has been updated to the latest version. Then, the file requesting unit 610 requests the server 607 to transfer the synchronization file determined by the file determining unit 611.

The update unit 613 updates the client-side EPG information according to the received synchronization file. The client database 612 stores the updated EPG information. The client scheduler 609 generates an event to download the synchronization file for synchronizing the EPG information.

As described above, the client 614 can synchronize its EPG information with the EPG information of the server 607 by downloading a next subsequent version of a current synchronization file. Thus, when requesting the synchronization file that is the next subsequent version, the client 614 has to know not only the version of the synchronization file currently stored in the client 614 but also the version of the synchronization file stored in the server 607. Also, the server 607 has to know the version of the synchronization file stored in the server 607. For this reason, when the server 607 generates the synchronization file, the data and time of file creation may be included in a file name.

Figure 7:
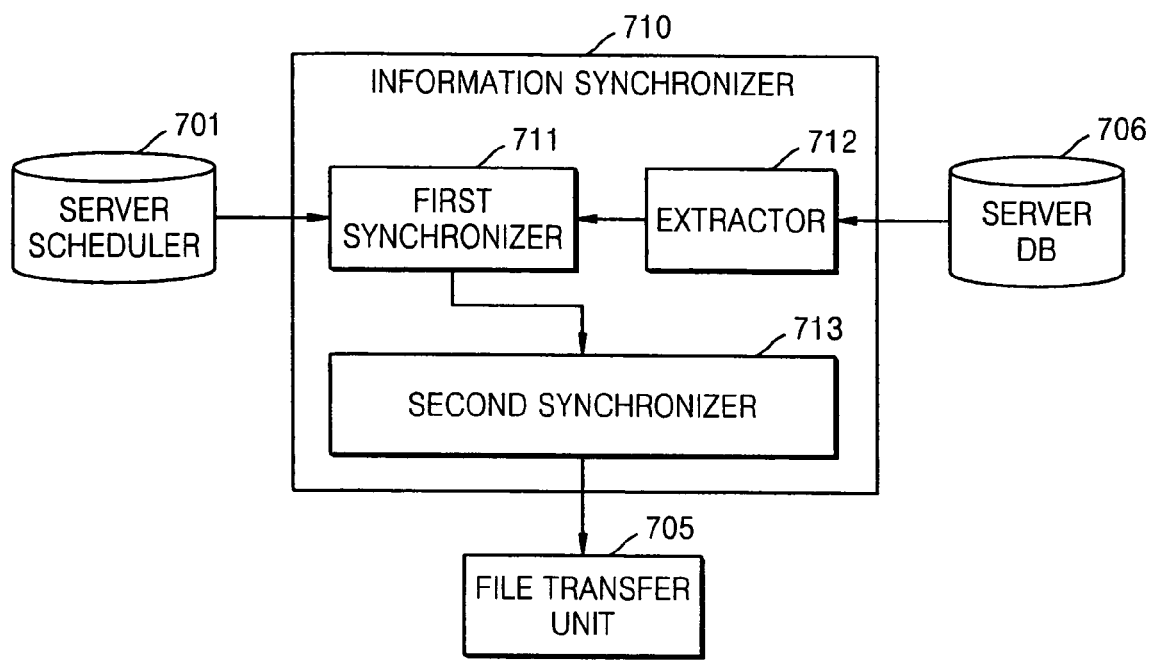
FIG. 7 illustrates a structure of an update information synchronizer according to an exemplary embodiment of the present invention.

FIG. 7 illustrates a structure of an update information synchronizer according to an exemplary embodiment of the present invention.

Referring to FIG. 7, an update information synchronizer 710 includes a first synchronizer 711, an extractor 712, and a second synchronizer 713. The extractor 712 extracts modified items from a server database 706 according to the action type field value as described above. The first synchronizer 711 updates an initial synchronization file by using the extracted items. Not all of the items extracted by the extractor 712 are used in updating the initial synchronization file, in practice. This will be described in detail later with reference to FIGS. 8 and 12. The second synchronizer 713 updates the rest of the synchronized files according to items which are used in updating the initial synchronization file, in practice.

Figure 8:
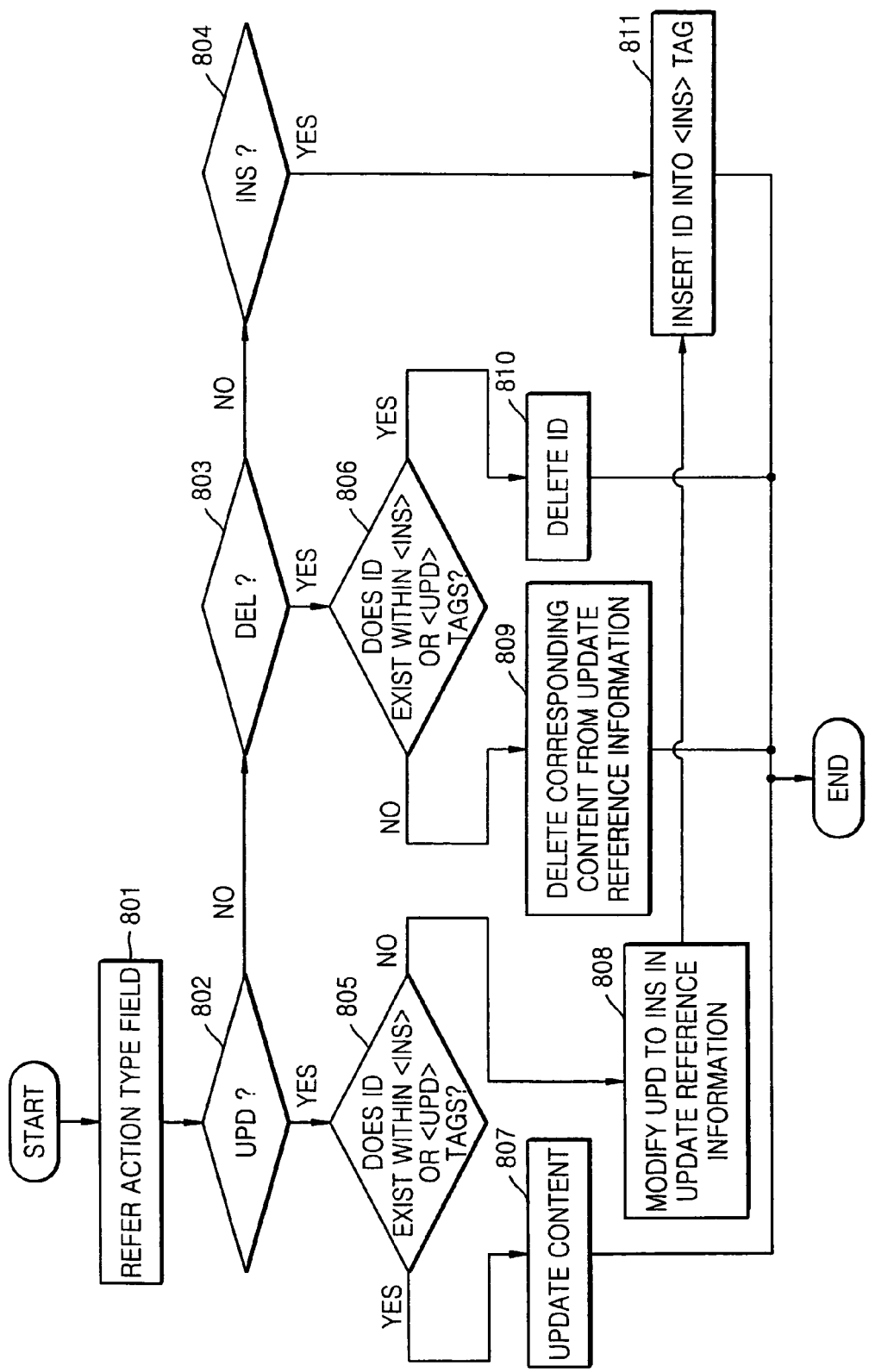
FIG. 8 is a flowchart of a process of a first synchronizer according to an exemplary embodiment of the present invention.

FIG. 8 is a flowchart of a process of the first synchronizer 711 according to an exemplary embodiment of the present invention.

When items modified by the extractor 712 are extracted, the first synchronizer 711 refers to the action type fields of each item (operation 801) and determines whether a field value thereof is UPD (operation 802). If it is UPD, whether an ID exists within the <Ins> or <Upd> tags in the initial synchronization file (operation 805) is checked. If it exists, the content of the file is updated (operation 807). If it does not exist, the action type fields of the extracted items are modified to INS (operation 808) to be inserted within the <Ins> tag in the initial synchronization file (operation 811). For example, if one item is inserted when the synchronization file is created and then the synchronization file is updated, the action type field of the item extracted by the extractor 712 indicates UPD. However, the initial synchronization file created according to only its previous version synchronization file does not even recognize that the item has been inserted. Thus, the initial synchronization file recognizes this as INS instead of UPD.

If the action type field indicates DEL (operation 803), whether the ID exists in the <Ins> or <Upd> tags of the initial synchronization file (operation 806) is checked. If it exists, the ID is deleted (operation 810). If it does not exist, the content of the item is deleted from the extracted items (operation 809).

If the action type field indicates INS (operation 804), the content of the ID is inserted within the <Ins> tag of the initial synchronization file (operation 811). In order to create reference information to be used to update the rest of the synchronization files, the extracted items are modified at the same time the initial synchronization file is updated. Hereinafter, the reference information will be referred to as update reference information.

If the initial synchronization file does not exist when the aforementioned operations are performed, the content of the initial synchronization file may be referred to. Alternatively, every operation for modifying the initial synchronization file may be treated as an error or be cancelled.

Figure 9:
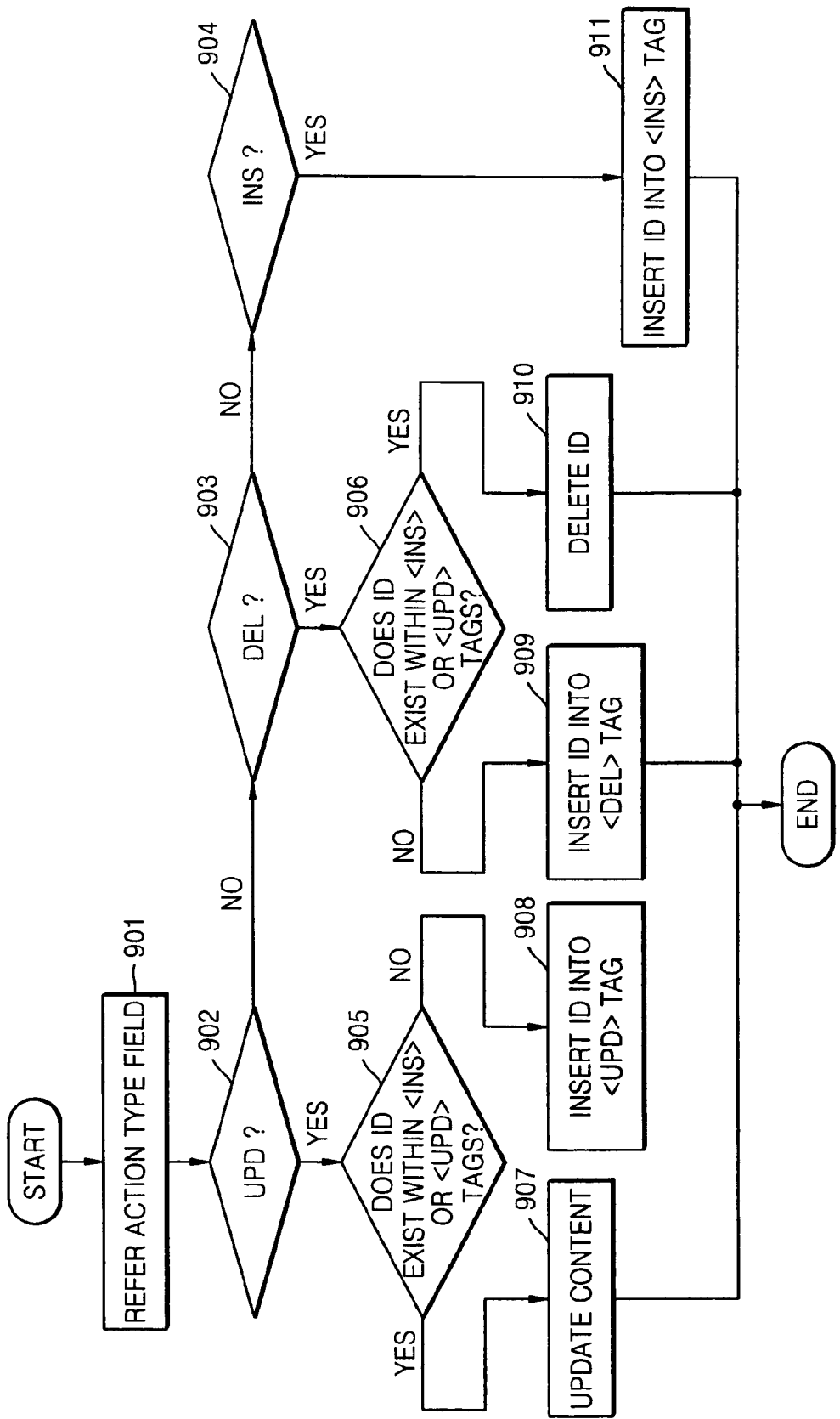
FIG. 9 is a flowchart of a process of a second synchronizer according to an exemplary embodiment of the present invention.

FIG. 9 is a flowchart of a process of the second synchronizer 713 according to an exemplary embodiment of the present invention.

As described above, the second synchronizer 713 updates the rest of the synchronization files instead of the initial synchronization file.

When the first synchronizer 711 creates the update reference information, the action type field of the update reference information is referred to (operation 901). Thereafter, if the action type field value is UPD (operation 902), whether an ID exists within the <Ins> or <Upd> tags in a file to be transferred (operation 905) is checked. If the ID exists, the content of the ID is updated (operation 907). If the ID does not exist, the ID is inserted within the <Upd> tag of the synchronization file (operation 908).

If the action type field value is DEL (operation 903), whether the ID exists in the <Ins> or <Upd> tags of the synchronization file (operation 906) is checked. If the ID exists, the ID is deleted (operation 910). If the ID does not exist, the ID is inserted within the <Del> tag of the file to be transferred (operation 909).

Figure 10A:
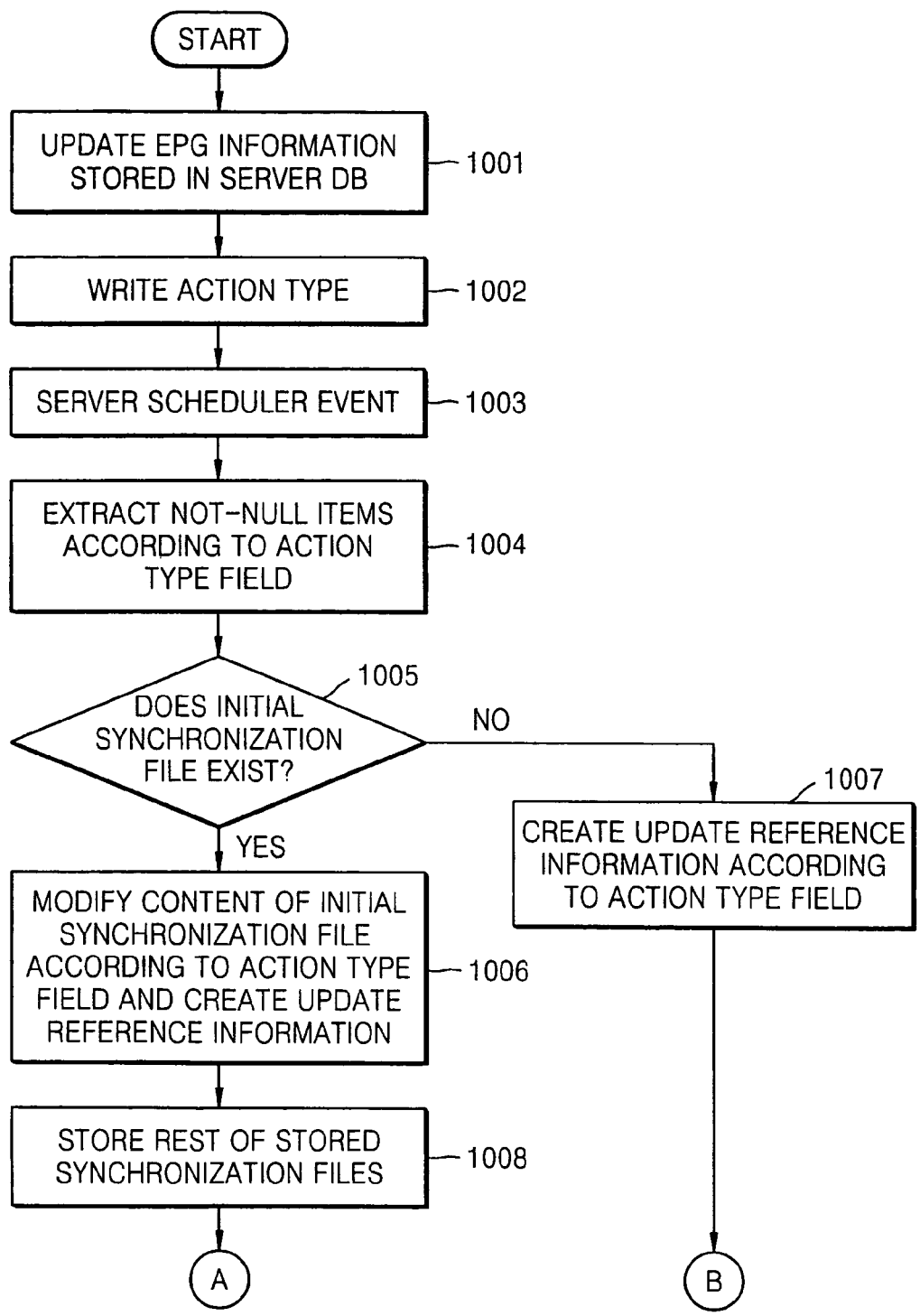
FIGS. 10A to 10B are flowcharts of a process of creating a synchronization file in a server according to an exemplary embodiment of the present invention.
Figure 10B:
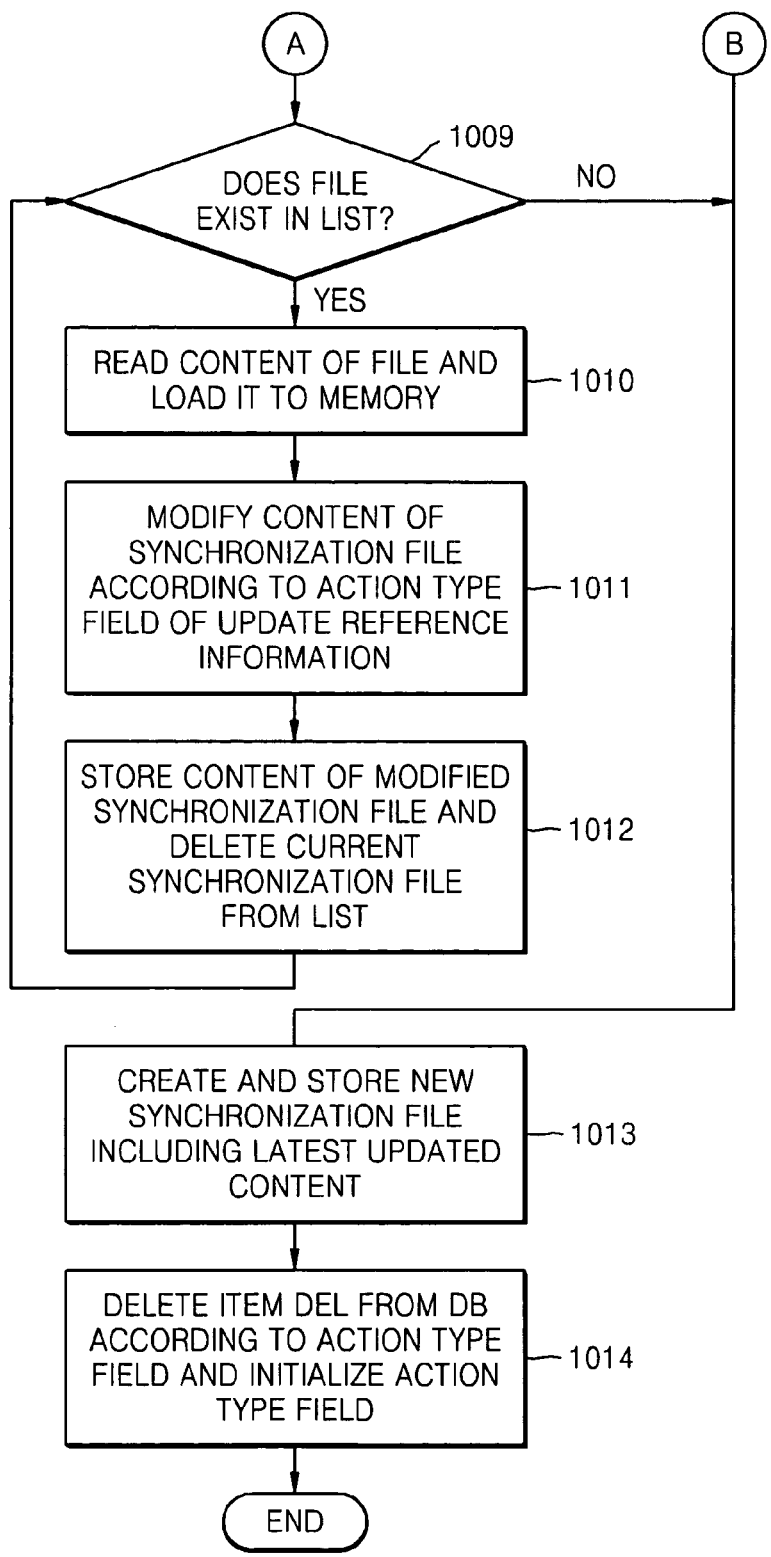

FIGS. 10A to B are flowcharts of a process of creating the synchronization file in the server according to an exemplary embodiment of the present invention.

When the EPG information is updated in the server (operation 1001), the current action type is written on the action type field of the EPG table to be stored in the database.

When it is time to create the synchronization file and thus the server scheduler generates an event therefore (operation 1003), the update information synchronizer updates the synchronization files according to the modification history of the EPG table. For this, the action type field of the EPG table is first referred to from the database to extract items which are not NULL (operation 1004). Next, it is determined whether the synchronization file exists (operation 1005). If it exists, the update reference information is created at the same time the initial synchronization file is updated as described above (operation 1007). If it does not exist, the initial synchronization file is created so that all items of the current EPG table are inserted into the initial synchronization file (operation 1013). Thereafter, the rest of the synchronization files are all updated (operations 1008 to 1012). If the last modification history is applied to all of the synchronization files, and the synchronization file configured according to only the last modification history is created (operation 1013), the items of which the action field value in the EPG table is DEL are completely deleted from the database, and all of the action type field values of the EPG table are initialized to NULL.

Figure 11:
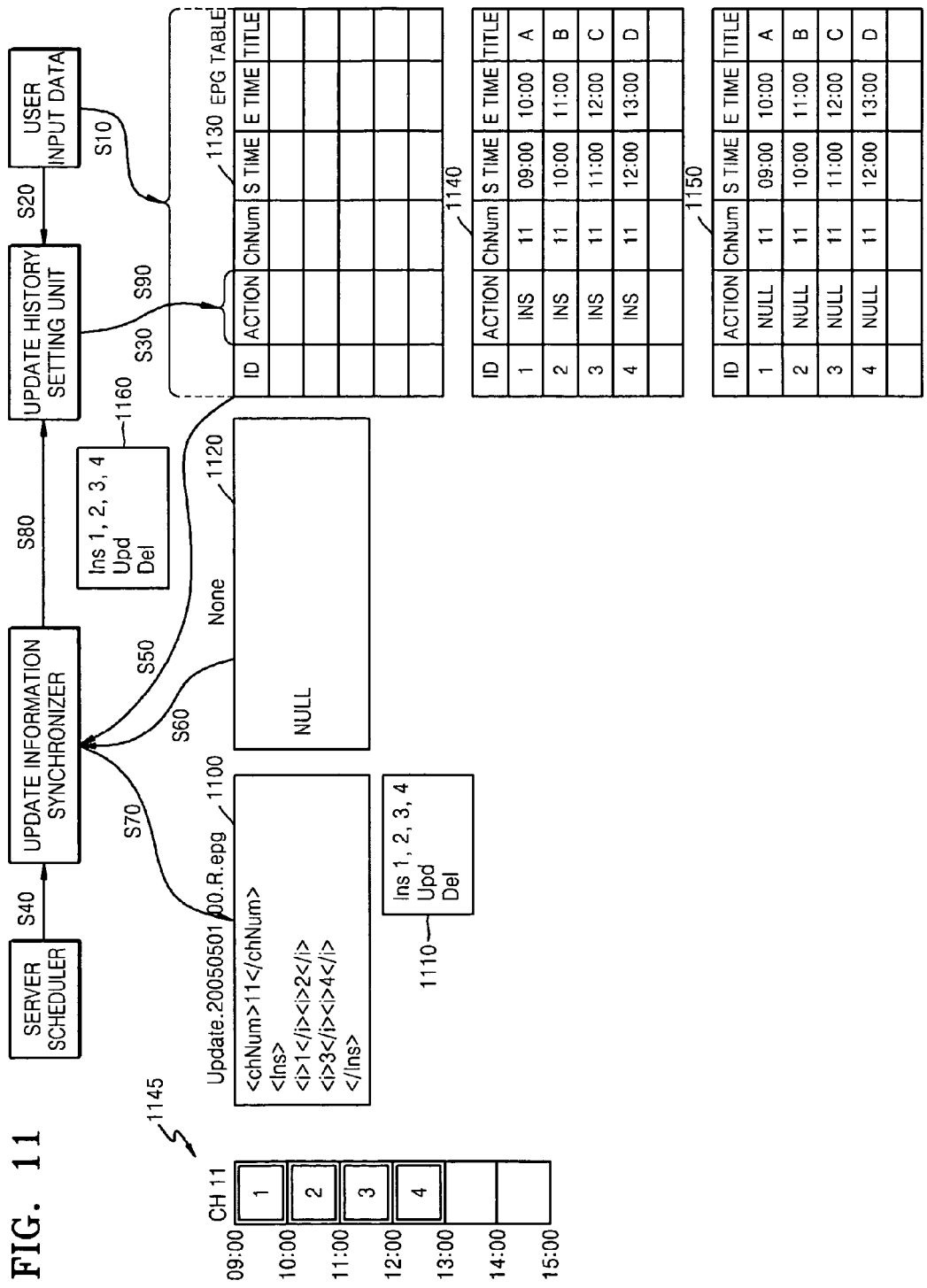
FIG. 11 illustrates a process of creating a synchronization file according to an exemplary embodiment of the present invention.

FIG. 11 illustrates a process of creating a synchronization file according to an exemplary embodiment of the present invention.

The server administrator inputs data to update EPG information (operation S10). Then, according to the input data, the update history setting unit writes action type information of each item to action type fields of an EPG table. FIG. 11 shows an EPG table 1130 with fields for ID, Action, Channel Number ("ChNum"), Start Time ("S TIME"), End Time ("E TIME") and TITLE. There are no inserted items in the first EPG table 1130. At a later time, four items are inserted in an EPG table 1140 to reflect the four items in the EPG 1145. In this case, four items are modified, and the action type thereof is INS.

When the scheduler generates an event to create the synchronization file (operation S40), the update information synchronizer extracts the modified items according to the action type field of the EPG table (operation S50). In order to create the update reference information, the update information synchronizer loads the initial synchronization file to a memory (operation S60). Since the initial synchronization file does not exist in this time, an initial synchronization file 1100 is created in which four items are inserted (operation S70). Up to now, update reference information 1110 is the same to the items extracted in operation S50. When the synchronization file is created, the update information synchronizer initializes all of the action type fields of an EPG table 1150 to NULL (operations S90).

Figure 12:
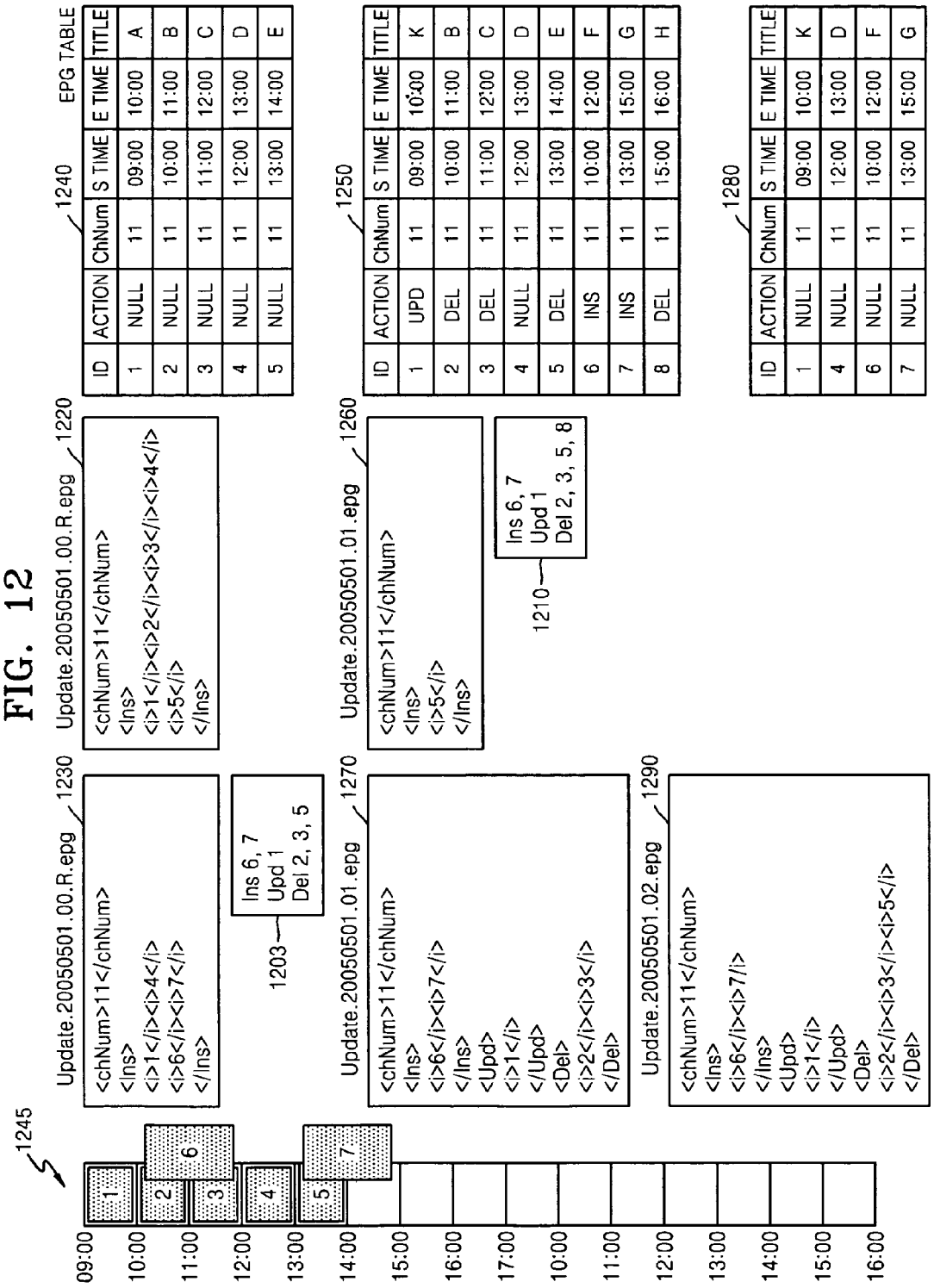
FIG. 12 illustrates a process of creating a synchronization file according to another exemplary embodiment of the present invention.

FIG. 12 illustrates a process of creating a synchronization file according to another exemplary embodiment of the present invention.

The process of creating the synchronization file will be now described. An EPG table 1240 contains five items to reflect the five items on the EPG 1245. In addition, an initial synchronization file 1220 and a synchronization file 1260 exist. In this case, items of ID 2 and ID 3 are all replaced by ID 6, ID 5 is replaced by ID7, ID 1 is updated, and ID 8 is inserted and then deleted. In other words, the programming referred to as ID 2, which was listed to run between 10:00 and 11:00, and ID 3, which was listed to run between 11:00 and 12:00, are replaced by ID 6, which is listed to run between 10:00 and 12:00, as shown in the EPG 1245. Furthermore, the programming referred to as ID 5, which is listed to run between 13:00 and 14:00, is replaced by ID 7 which runs between 13:00 and 15:00, as shown in the EPG 1245.

First, the server administrator modifies EPG information in the same way as described above. As a result, each item of an EPG table 1250 is modified. Update reference information 1210 is extracted to be applied to the initial synchronization file 1220, thereby creating an updated initial synchronization file 1230. Newly inserted ID 6 and ID 7 are inserted within the <Ins> tag of the initial synchronization file 1220. Since ID 1 already exists within the <Ins> tag, the updated content is overwritten. When deleting, ID 2, 3, and 5 are deleted since they exist within the <Ins> tag, but ID 8 is not deleted since it does not exist within any tags. Therefore, the content of ID 8 is deleted from the extracted items to generate update reference information 1203.

The previous synchronization files are updated according to the created update reference information 1203. Referring to FIG. 12, a synchronization file 1270 is updated by using the previous synchronization file 1260. That is, ID 5 is deleted from the <Ins> tag, and the rest of items are inserted within relevant tags. After the first synchronization file and the previous synchronization file are updated, a last synchronization file 1290 is created which contains only the update reference information. As described above, each synchronization file may include a file creation date and time so as to know the order of file creation.

When file creation and update are completed with respect to the synchronization files, data corresponding to items of which the action type field values are DEL is deleted from the EPG table 1250, and the action type fields are initialized to NULL (operation 1280).

Figure 13:
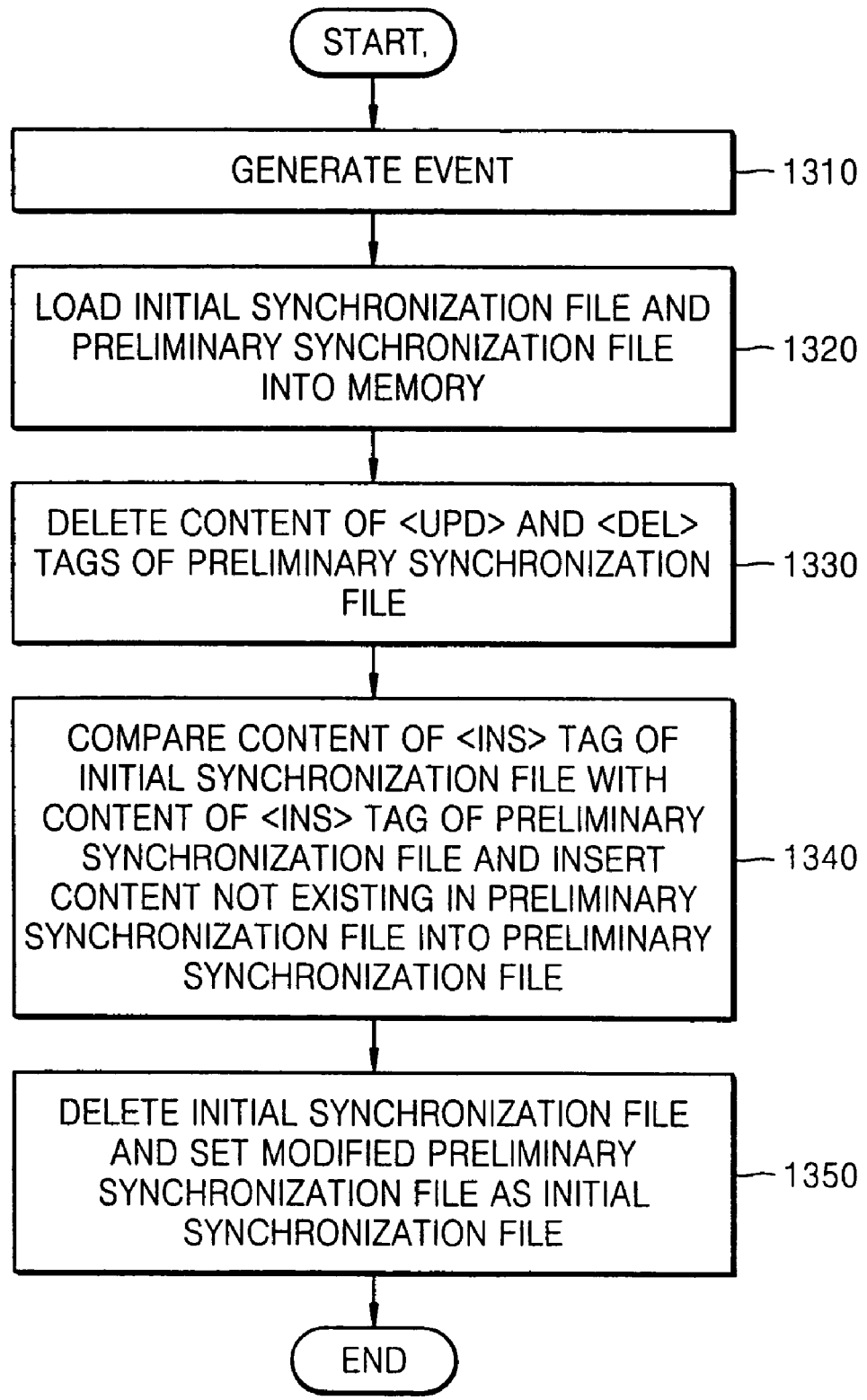
FIG. 13 is a flowchart of a process of a synchronization file manager according to an exemplary embodiment of the present invention.

FIG. 13 is a flowchart of a process of the synchronization file manager 604 according to an exemplary embodiment of the present invention.

As time elapses, old synchronization files need to be deleted starting from the oldest synchronization file, since the content of the old files become the same with each other over time. For example, if a valid time period of EPG information is set to one week, synchronization files which have been created more than one week ago are deleted. In this case, as describe above, the initial synchronization file has to exist all the time due to the characteristics of the synchronization system of the present invention. Thus, a later version synchronization file needs to be configured to be the new initial synchronization file prior the deletion of the initial synchronization file. The later version synchronization file is the second oldest file, following the first synchronized file. Hereinafter, the later version synchronization file will be referred to as a preliminary synchronization file.

When the scheduler generates an event to delete the initial synchronization file after a predetermined time elapses (operation 1310), the initial synchronization file and the preliminary synchronization file are loaded in a memory (operation 1320). Next, the content written within the <Upd> and <Del> tags in the preliminary synchronization file is all deleted (operation 1330). Thereafter, the content of the <Ins> tag of the initial synchronization file and the preliminary synchronization file are compared with each other, and IDs which exist only in the initial synchronization file are inserted within the <Ins> tag of the preliminary synchronization file (operation 1340). Thereby, the preliminary synchronization file has content indicating that all of the items included in the current EPG information have to be inserted. Thereafter, the initial synchronization file is deleted, and the file name of the modified preliminary synchronization file is determined to be the same as the initial synchronization file (operation 1350).

Figure 14:
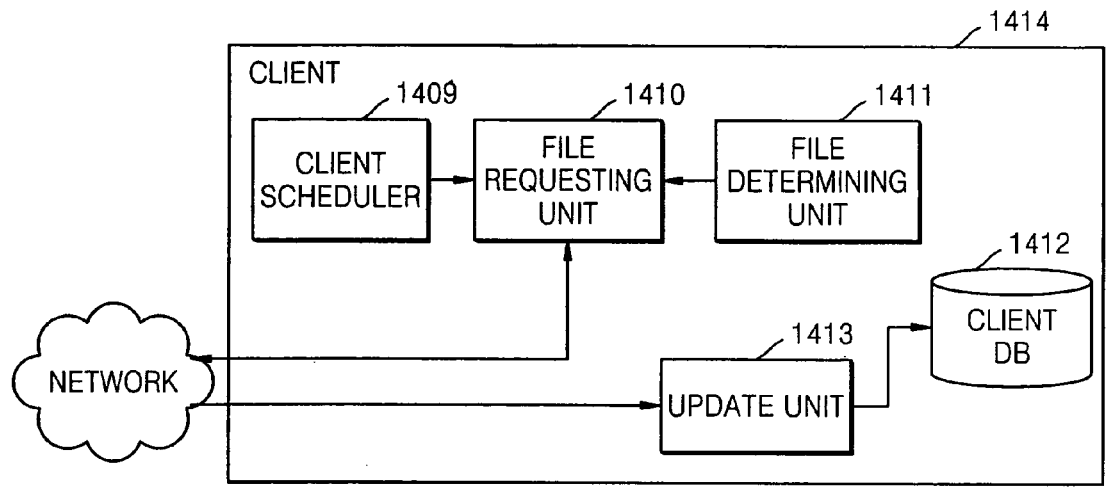
FIG. 14 illustrates a structure of a client according to an exemplary embodiment of the present invention.

FIG. 14 illustrates a structure of a client 1414 according to an exemplary embodiment of the present invention.

Referring to FIG. 14, the client 1414 includes a client scheduler 1409, a file requesting unit 1410, a file determining unit 1411, a database (DB) 1412, and an update unit 1413.

The client scheduler 1409 generates an event to update the EPG information after a predetermined time elapses. The file determining unit 1411 determines a synchronization file to be received which is included in the list of synchronization files received from the server 607 through the file requesting unit 1410. For this, a system update time has to be stored in the client 1414 whenever the EPS information is updated in the DB 1412. When the synchronization file to be received is determined at a later time, the system update time is referred to so that the synchronization file to be received can be determined to be a file created right after the system update time among from the server-side synchronization files. This is because the file contains all content updated from when the client 1414 updates the EPG information up to the present. As described above, when the server-side synchronization file is created, the synchronization file name includes the file creation date and time. The synchronization file name may be "Update.20050531.10.epg", which indicates that the synchronization file was created at 2005, May, 31, 10:00 am. The file determining unit 1411 can select a required synchronization file according to the file name.

The file requesting unit 1410 requests the server 607 to transfer the synchronization file selected by the file determining unit 1411. In response to the request, the update unit 1413 updates the EPG information stored in the DB 1412 by using the received synchronization file.

Figure 15:
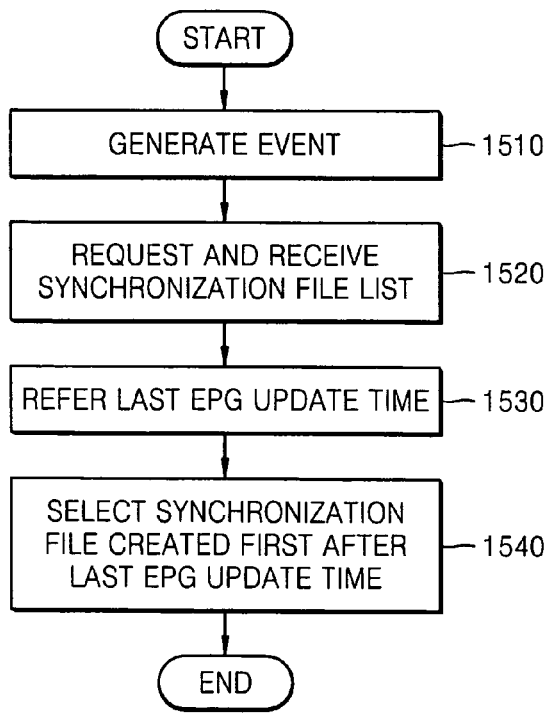
FIG. 15 is a flowchart of a process of a synchronization file manager according to another exemplary embodiment of the present invention.

FIG. 15 is a flowchart of a process of the synchronization file manager 604 according to another exemplary embodiment of the present invention.

The client scheduler 1409 generates an event to update the EPG (operation 1510). Then, the synchronization file list is requested from and received from the server 607 (operation 1520). To determine the synchronization file to be received in the synchronization file list, a last update time stored in the DB 1412 is referred to (operation 1530). The synchronization file created first after the last EPG update time has elapsed, is selected (operation 1540). When the synchronization file is selected, the file creation date and time included in the file name are referred to.

Accordingly, in a digital broadcasting network of the present invention, in the server aspect, a storage space can be saved since unnecessary data is not stored after EPG information is updated. In the network aspect, network resources required to transfer a synchronization file can be saved since the file size is reduced according to only a last update state of the EPG information without having to include all update history when the synchronization file is created in a server. In the client aspect, client-side EPG information can be easily synchronized with sever-side EPG information by downloading only one synchronization file created first after the currently stored last synchronization file was created regardless of when the latest EPG information was updated.

Meanwhile, the exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

Although the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of providing synchronization files to clients to synchronize server-side electronic program guide (EPG) information with client-side EPG information, the method comprising:

if synchronization files were created according to respective updates of the server-side EPG information, updating the synchronization files according to information which has been modified after a last synchronization file of the synchronization files is created, wherein updating the synchronization files comprises appending each of the synchronization files with the information which has been modified;

creating a new synchronization file according to the information which has been modified after the last synchronization file is created; and transferring a first synchronization file to one of the clients, the first synchronization file being one of the plurality of the synchronization files or the new synchronization file, wherein the first synchronization file is the synchronization file which is created first after the client-side EPG information has been updated.

2. The method of claim 1, further comprising:

writing action type information into an action type field of an item modified, in an EPG table whenever the server-side EPG information is updated; and initializing the action type field after the creating the new synchronization file, wherein, in the updating the synchronization files, the information which is modified is recognized with reference to the action type field.

3. The method of claim 2, further comprising, after the creating the new synchronization file, deleting data from a server if the data corresponds to a delete item in the action type field.

4. The method of claim 1, wherein the updating the synchronization files comprises:

updating an oldest synchronization file of the synchronization files to include recent EPG information; and updating remaining synchronization files of the synchronization files other than the oldest synchronization file according to information on the oldest synchronization file.

5. The method of claim 1, wherein, in the creating the new synchronization file, the new synchronization file is created such that a file name of the new synchronization file comprises information on a file creation date and information on a file creation time.

6. The method of claim 1, further comprising:

updating a second oldest synchronization file of the synchronization files at a first time after the creating the new synchronization file, so that the second oldest file includes recent EPG information; and deleting an oldest synchronization file of the synchronization files from a server.

7. The method of claim 1, wherein, if there are no synchronization files to be updated, the new synchronization file which is created includes information on all items in a recent EPG table.

8. A computer-readable medium having embodied thereon a computer program executable by a machine for executing a method of providing synchronization files to clients to synchronize server-side electronic program guide (EPG) information with client-side EPG information, the method comprising:

if synchronization files were created according to respective updates of the server-side EPG information, updating the synchronization files according to information which has been modified after a last synchronization file of the synchronization files is created, wherein updating the synchronization files comprises appending each of the synchronization files with the information which has been modified;

creating a new synchronization file according to the information which has been modified after the last synchronization file is created; and transferring a first synchronization file to one of the clients, the first synchronization file being one of the plurality of the synchronization files or the new synchronization file, wherein the first synchronization file is the synchronization file which is created first after the client-side EPG information has been updated.

9. A server apparatus for providing synchronization files to clients so as to synchronize server-side electronic program guide (EPG) information with client-side EPG information, the apparatus comprising:

a file storing unit which stores synchronization files created according to the respective updates of the server-side EPG information;

a scheduler which generates an event to create a new synchronization file according to items that have been modified in an EPG table after a last synchronization file of the synchronization files is created;

an update information synchronizer which updates the synchronization files stored in the file storing unit according to the items that have been modified by appending the items that have been modified to each of the synchronization files when the event is generated, creates the new synchronization file based on the items that have been modified, and stores the new synchronization file in the file storing unit; and a file transfer unit which transfers a first synchronization file to one of the clients, wherein the first synchronization file is the synchronization file which is created first after the client-side EPG information of the one of clients has been updated, the first synchronization file being one of the synchronization files and the new synchronization file stored in the file storing unit.

10. The apparatus of claim 9, further comprising:

an update history setting unit which writes action type information into an action type field of the item that is modified, in the EPG table to be stored in a database when the server-side EPG information is updated, and initializes the action type field if the update information synchronizer creates the new synchronization file according to the item that is modified, wherein the update information synchronizer recognizes the item that is modified with reference to the action type field.

11. The apparatus of claim 10, wherein the update history setting unit deletes data from the database if the data corresponds to a delete item of the action type field, when the update information synchronizer creates the new synchronization file based on the item that is modified.

12. The apparatus of claim 9, wherein the update information synchronizer comprises:

a first synchronizer which updates an oldest synchronization file of the synchronization files stored in the file storing unit, so that the oldest synchronization file includes recent EPG information; and a second synchronizer which updates rest of synchronization files other than the oldest synchronization file stored in the file storing unit according to an update of the oldest synchronization file by the first synchronizer.

13. The apparatus of claim 9, wherein the update information synchronizer is operable to generate a synchronization file name including information on a file creation date and information on a file creation time when the new synchronization file is created according to the items that is modified.

14. The apparatus of claim 9, further comprising a synchronization file manager which updates a second oldest synchronization file of the synchronization files stored in the file storing unit if an event for file management is generated, so that the second oldest synchronization file reflects recent EPG information, and then deletes an oldest synchronization file of the synchronization files stored in the file storing unit, wherein the scheduler generates the event for file management cyclically at time intervals.

15. A method of synchronizing client-side electronic program guide (EPG) information with server-side EPG information in a digital broadcasting network, wherein the method is performed by a client, the method comprising:

receiving a list of synchronization files which are created according to updates of the server-side EPG information from a server;

selecting a synchronization file in the list of the synchronization files, the synchronization file which being created first after a latest update time of the client-side EPG information, and receiving the synchronization file from the server; and updating the client-side EPG information by using the received synchronization file, wherein all of the synchronization files in the list contain recent server-side EPG information modifications appended to each of the synchronization files in the list.

16. The method of claim 15, wherein each of the synchronization files in the list has a file name comprising information on a file creation date and information on a file creation time.

17. A computer-readable medium having embodied thereon a computer program executable by a client for executing a method of synchronizing client-side electronic program guide (EPG) information with server-side EPG information in a digital broadcasting network, the method comprising:

receiving a list of synchronization files which are created according to updates of the server-side EPG information from a server;

selecting a synchronization file in the list of the synchronization files, the synchronization file which being created first after a latest update time of the client-side EPG information, and receiving the synchronization file from the server; and updating the client-side EPG information by using the received synchronization file, wherein all of the synchronization files in the list contain recent server-side EPG information modifications appended to each of the synchronization files in the list.

18. A client apparatus for synchronizing client-side EPG information with server-side EPG information in a digital broadcasting network, the apparatus comprising:

a file determining unit which determines a file to be received, the file to be received being included in a synchronization file list which is received from a server, the file being a synchronization file created first after the client-side EPG information is updated to a latest version;

a file requesting unit which requests the synchronization file selected in the file determining unit from the sever in a file request; and an update unit which updates the client-side EPG information by using the synchronization file received from the server in response to the file request, wherein all of the synchronization files in the list contain recent server-side EPG information modifications appended to each of the synchronization files in the list.

19. The apparatus of claim 18, wherein each of the synchronization files in the list has a file name comprising information on a file creation date and information on a file creation time.

20. The method of claim 6, wherein the first time is predetermined.

21. The apparatus of claim 14, wherein the time intervals are predetermined.

* * * * *